(12) United States Patent
Delaporte

(10) Patent No.: US 12,090,390 B2
(45) Date of Patent: Sep. 17, 2024

(54) GAMING MOTION CONTROL INTERFACE USING FOLDABLE DEVICE MECHANICS

(71) Applicant: Lepton Computing LLC, Brooklyn, NY (US)

(72) Inventor: Stephen E. Delaporte, Brooklyn, NY (US)

(73) Assignee: LEPTON COMPUTING LLC, Brooklyn, NY (US)

(*) Notice: Subject to any disclaimer, the term of this patent is extended or adjusted under 35 U.S.C. 154(b) by 88 days.

(21) Appl. No.: 17/539,194

(22) Filed: Nov. 30, 2021

(65) Prior Publication Data
US 2022/0212096 A1 Jul. 7, 2022

Related U.S. Application Data

(60) Provisional application No. 63/119,646, filed on Nov. 30, 2020.

(51) Int. Cl.
*A63F 13/2145* (2014.01)
*G06F 3/0346* (2013.01)

(52) U.S. Cl.
CPC ........ *A63F 13/2145* (2014.09); *G06F 3/0346* (2013.01)

(58) Field of Classification Search
CPC .... A63F 13/2145; A63F 13/211; A63F 13/24; A63F 13/812; G06F 3/0346
See application file for complete search history.

(56) References Cited

U.S. PATENT DOCUMENTS

| | | | | |
|---|---|---|---|---|
| 5,850,206 A * | 12/1998 | Kashiwagi | ............. | G06T 17/00 345/157 |
| 8,816,977 B2 * | 8/2014 | Rothkopf | ............... | G06F 3/016 345/169 |
| 9,152,176 B2 * | 10/2015 | Gimpl | ................... | G06F 1/1677 |
| 9,173,288 B1 * | 10/2015 | Kim | ...................... | G06F 1/1681 |
| 9,904,501 B2 * | 2/2018 | Becze | .................... | H04N 23/63 |
| 9,931,563 B2 * | 4/2018 | Schwind | ............... | A63F 13/843 |
| 9,934,735 B2 * | 4/2018 | Wei | ....................... | G09G 3/3611 |
| 10,175,725 B2 * | 1/2019 | Jung | ...................... | G09G 3/035 |
| 10,387,096 B2 * | 8/2019 | Kim | ....................... | G06F 3/1423 |
| 10,936,166 B2 * | 3/2021 | Kang | .................... | G06F 1/1652 |
| 11,216,040 B2 * | 1/2022 | Park | ...................... | G06F 1/1677 |
| 11,226,784 B2 * | 1/2022 | Kim | .................... | H04M 1/0243 |
| 11,423,860 B2 * | 8/2022 | Iyer | ........................ | G06F 1/1677 |

(Continued)

*Primary Examiner* — Chase E Leichliter
(74) *Attorney, Agent, or Firm* — ArentFox Schiff LLP; Joseph M. Maraia

(57) ABSTRACT

A foldable touch screen display device made up of flexible or tiled display segments that can be folded from a compact state to an expanded state which also includes a gaming motion control interface. The form factor of the compact state is roughly the size of a typical handheld phone or smaller. The form factor of the expanded state is roughly the size of a larger phone or tablet computer, which may also have the mechanical functionality of a laptop. The gaming motion control interface can provide enhanced interaction and viewing of a game application by utilizing the inherent folding mechanics and position of each display segment relative to each other such that a virtual object or point of reference shown on the display corresponds with the device's folding motion. Other applications that do not relate to gaming may also be applied utilizing the same techniques disclosed.

18 Claims, 3 Drawing Sheets

(56) References Cited

U.S. PATENT DOCUMENTS

| | | | |
|---|---|---|---|
| 2008/0238879 A1* | 10/2008 | Jaeger | G06F 3/0338 345/173 |
| 2009/0131117 A1* | 5/2009 | Choi | G06F 1/1649 345/173 |
| 2010/0045705 A1* | 2/2010 | Vertegaal | G06F 1/1613 345/173 |
| 2010/0064536 A1* | 3/2010 | Caskey | G06F 1/1694 33/303 |
| 2010/0120470 A1* | 5/2010 | Kim | H04M 1/0268 715/830 |
| 2013/0321340 A1* | 12/2013 | Seo | G06F 3/04842 345/174 |
| 2015/0153778 A1* | 6/2015 | Jung | G06F 1/1677 345/156 |
| 2015/0316995 A1* | 11/2015 | Tamaki | G06F 1/1652 345/156 |
| 2016/0059120 A1* | 3/2016 | Komorous-King | A63F 13/211 463/36 |
| 2016/0334924 A1* | 11/2016 | Heubel | G06F 3/0488 |
| 2017/0034320 A1* | 2/2017 | Stewart | G06F 1/1652 |
| 2018/0104573 A1* | 4/2018 | Jeffery | A63F 13/35 |
| 2019/0042066 A1* | 2/2019 | Kim | H04M 1/725 |
| 2019/0073035 A1* | 3/2019 | Modarres | H04M 1/0268 |
| 2020/0042273 A1* | 2/2020 | Dong | G06F 1/1673 |
| 2020/0233536 A1* | 7/2020 | Hong | G06F 1/1641 |
| 2020/0275564 A1* | 8/2020 | Yu | H01L 25/167 |
| 2020/0320906 A1* | 10/2020 | Knarr | G06F 1/1626 |
| 2020/0379516 A1* | 12/2020 | Park | G06F 1/1652 |
| 2021/0096732 A1* | 4/2021 | Sonnino | G06F 3/04842 |
| 2021/0096742 A1* | 4/2021 | Yoon | G06F 3/04883 |
| 2021/0149559 A1* | 5/2021 | Seo | G06F 1/1652 |
| 2022/0197342 A1* | 6/2022 | Delaporte | G06F 3/04815 |
| 2022/0212096 A1* | 7/2022 | Delaporte | G06F 1/1677 |

* cited by examiner

GAMING MOTION CONTROL INTERFACE USING FOLDABLE DEVICE MECHANICS

CROSS REFERENCE TO RELATED APPLICATIONS

This application claims the benefit of U.S. Provisional Patent Application No. 63/119,646, filed on Nov. 30, 2020, which is incorporated in its entirety herein by reference.

FIELD OF THE INVENTION

The present invention relates generally to computing devices, and more particularly, to a computing device with a touch screen display that can be folded from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic intensive applications, and reading text. The rigid nature of a standard touch screen display can also limit the portability of a device when its form factor is in the larger size range for a phone, or at the scale of a tablet, which makes folding a desirable feature. Additionally, because a foldable device has an integrated hinge mechanism used to fold the device, this fundamental hardware component along with having multiple display segments can be further optimized to accommodate the enhancement and functionality of software applications as well.

There is therefore a need for touch screen display devices that can be adjusted in size without sacrificing the convenience of being in a compact or handheld state. There is also a benefit to having a gaming motion control interface that can utilize the inherent hinge mechanics and various positions that the display segments of a foldable device can be configured to, such as games where a point of interest or an object like a tennis racket or a basketball is set in motion by corresponding to the motion of the segment's manually controlled motion. There is also a need for other software applications where these same inherent hardware features of a foldable device can help to enhance functionality that are not based in gaming, such as apps where controlling a cursor point or scrolling through a list is an important feature.

SUMMARY OF EMBODIMENTS OF THE INVENTION

A foldable touch screen display device made up of flexible or tiled display segments that can be folded from a compact state to an expanded state which also includes a gaming motion control interface. The form factor of the compact state is roughly the size of a typical handheld phone or smaller. The form factor of the expanded state is roughly the size of a larger phone or tablet computer, which may also have the size and mechanical functionality of a laptop. The device form factor may also be a flip phone configuration. The gaming motion control interface can provide enhanced interaction and viewing of a game application by utilizing the inherent folding mechanics and position of each segment relative to each other such that a virtual object or point of reference shown on the display corresponds with the device's folding motion. Other applications that do not relate to gaming may also be applied utilizing the same techniques. The device may further include multiple sensors to indicate the position of each display segment. In one embodiment, a module attached to, situated within, or otherwise associated with at least one segment of the flexible display or rigid display may contain all or substantially all processing and memory, along with a communications system, which may be used in any folded state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
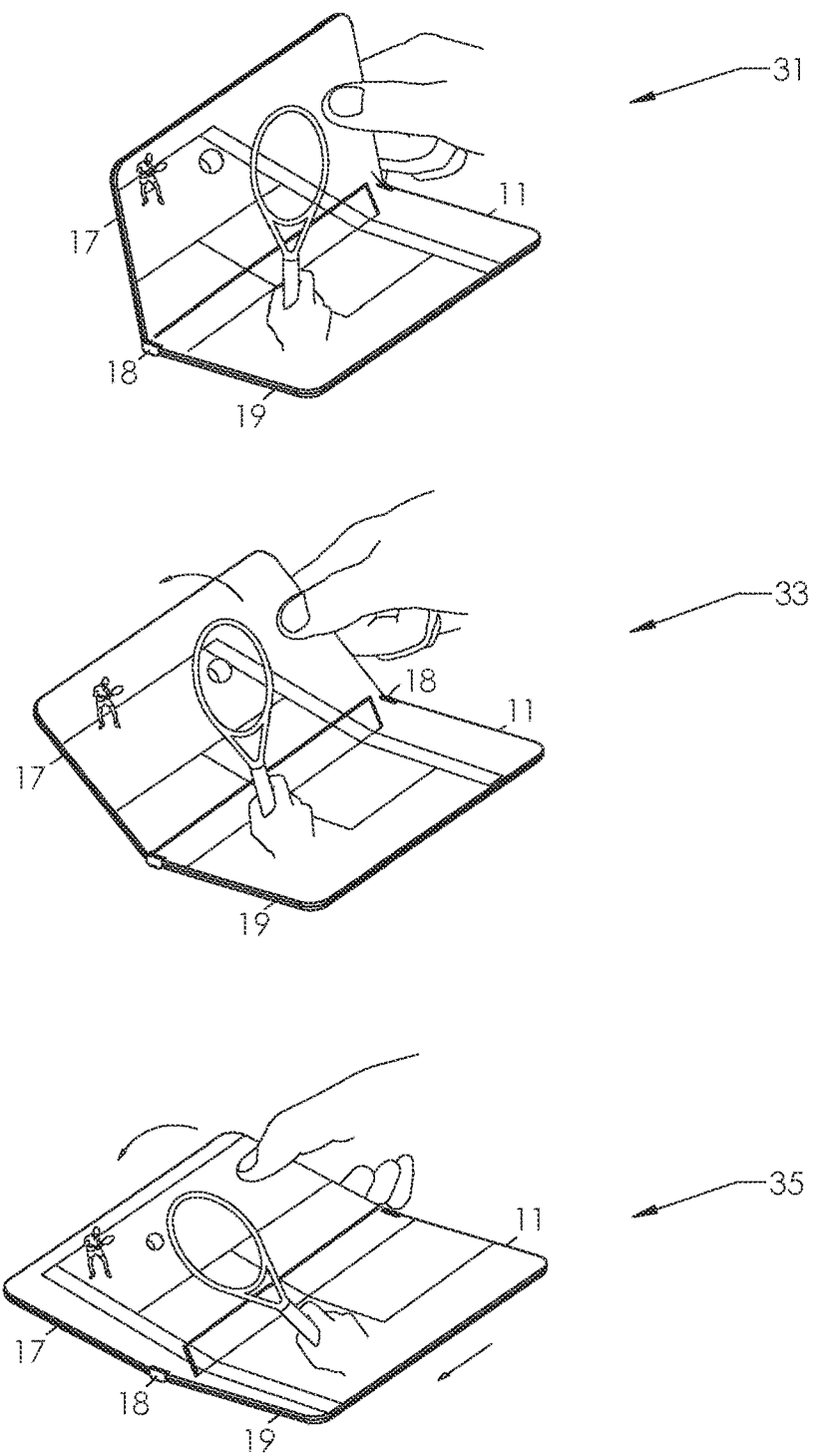
FIG. 1 is a perspective view of a foldable computing device shown in three separate positions where one segment remains fixed displaying a portion of the 3D view of a tennis court while the other segment is being rotated to simulate the motion of a tennis racquet.

In accordance with the exemplary embodiment shown in FIG. 1, a foldable computing device 11 is illustrated having a flexible touch screen display where one flexible display segment, which is shown to the right side, segment 19, remains fixed along the ground plane axis while the other flexible display segment on the left side, segment 17, is shown being rotated into three positions, 31, 33, and 35 about hinge 18 which is situated between display segments 17 and 19. The position of segment 17 is determined by a user's physical force applied to the segment to achieve a desired folded angle and velocity which corresponds to the position and velocity of the virtual tennis racket shown on the display. In position 31, since segment 17 is configured with its edge pointing upward such that the face of the display is at approximately a right angle to the 3D view of the tennis court, the tennis racket shown is also situated in a vertical position corresponding to the same angle of segment 17 relative to segment 19 which is parallel to the ground plane of the tennis court shown in the 3D view. Also displayed on segment 17 is the tennis player opponent shown on the opposite side of the tennis court where the net is situated on the display along the length of hinge 18 and the main folding line of the device. The tennis ball in position 31 is also shown in the foreground approaching the tennis racket on display segment 17. In position 33, as segment 17 is rotated closer to a 45 degree angle, the 3D view of the tennis court from the perspective of the user remains the same while the position of the tennis racket moves to a position that corresponds to the 45 degree angle of segment 17 relative to segment 19. In this same position, the tennis ball is shown hitting the tennis racket. In position 35, as segment 17 is rotated closer to the ground plane angle, the 3D view of the tennis court continues to remain in the same position from the perspective of the user, however, because the device is shifted to the left side of the court as it is shown on the display and also emphasized with an arrow diagrammatically shown below the device, the view of the tennis court also shifts to the left. This motion translated from the physical position of the device to the virtual position of the tennis court may be derived from the use of other kinds of sensors integrated with the device such as accelerometers or IR sensors which can determine the motion along the plane parallel to the ground plane. An encoder may be used to translate the position and velocity of the hinge and segment motion. Other kinds of games that have an object that requires motion control can also be used with this same technique, such as the control of a baseball bat, a ping pong paddle, a cricket paddle, a pool stick, a javelin, a fencing sword, an archery bow, and so on. The motion of a hand to throw a basketball or a football, or the motion of a leg to kick a soccer ball and other kinds of sports that require a limb's motion to be controlled, may also be used in the same way where the manually controlled motion of the device's segment corresponds with the motion of the segment rotated about the device's hinge.

Similarly, applications that require motion control of an object or a point of interest shown on the display may also correspond with the motion of the segment as it is manually rotated, such as moving a cursor for grabbing or pushing an item virtually or for scrolling through a list where the scrolling speed and other parameters can change based upon how the segment of the device is angled relative to the device's other display segment. An actuator may also be integrated to physically rotate the device based upon a graphical object moving on the display such as an opponent in a tennis game as their tennis racket moves. This could enhance the playing dynamics and it could also act as haptic feedback as the user holds the display segment that they are manually rotating to virtually move the graphical object in the displayed environment, in this case a tennis racket. This control interface may also be used for Virtual Reality or Augmented Reality applications. It is also important to note that while the embodiments show a single flexible display with two display segments, a rigid cover display may also be included with the device, and two rigid tiled display segments may also be integrated instead of having a flexible display.

Figure 2:
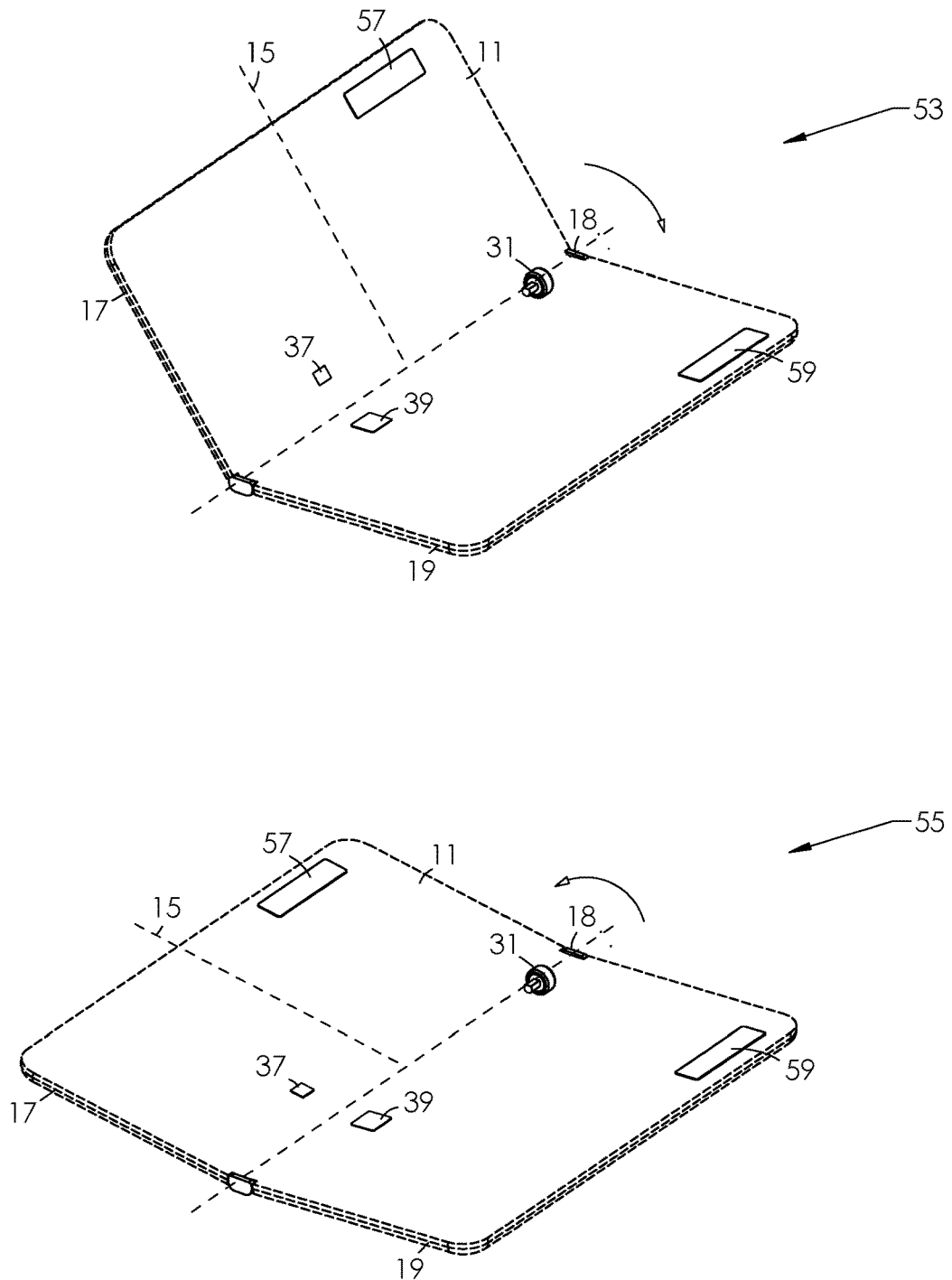
FIG. 2 is a perspective view of the foldable computing device shown in two separate positions enlarged from FIG. 1 to highlight the internal location of the accelerometers, encoder and magnetic sensor.

In FIG. 2, a perspective view of the foldable computing device 11 is shown in two separate positions, position 53 and position 55, which is an enlarged view of the same motion sequence shown from FIG. 1. The primary objective of this diagram is to highlight the internal location of the inertial measurement units or accelerometers 57 and 59, the encoder 31, and the magnetic sensor 37 and its corresponding magnet 39. Each of these hardware components can be used to detect the position, and as a result, the direction and velocity of motion of display segments 17 and 19 relative to each other so that the processor of foldable computing device 11 can then correspond that position with the position of the designated graphical item shown on the display. Either a single accelerometer or both accelerometers can be used to detect the position of the segments relative to each other or they could be used to detect the position and motion of display segments 17 and 19 in space relative to the physical ground plane. The center axis 15 of flexible display segment 17, highlights how the angle between flexible display segment 17 and flexible display segment 19 is different between position 53 and position 55. This would allow a 3D perspective of an environment shown on the display to change in accordance with the device as it is moved around in space while also allowing the control interface that is governed by the motion of the segments rotating to function simultaneously to control the designated graphical item. This is where a secondary sensor such as encoder 31 would help to enhance this control interface function. Magnetic sensor 37, which could be different kinds of magnetic sensors, such as a hall sensor, might also assist with this control interface in that it could detect the location of display segments 17 and 19 relative to each other, or it could be used to just trigger the other sensors after detecting the initial motion of the device when it is being folded.

Figure 3:
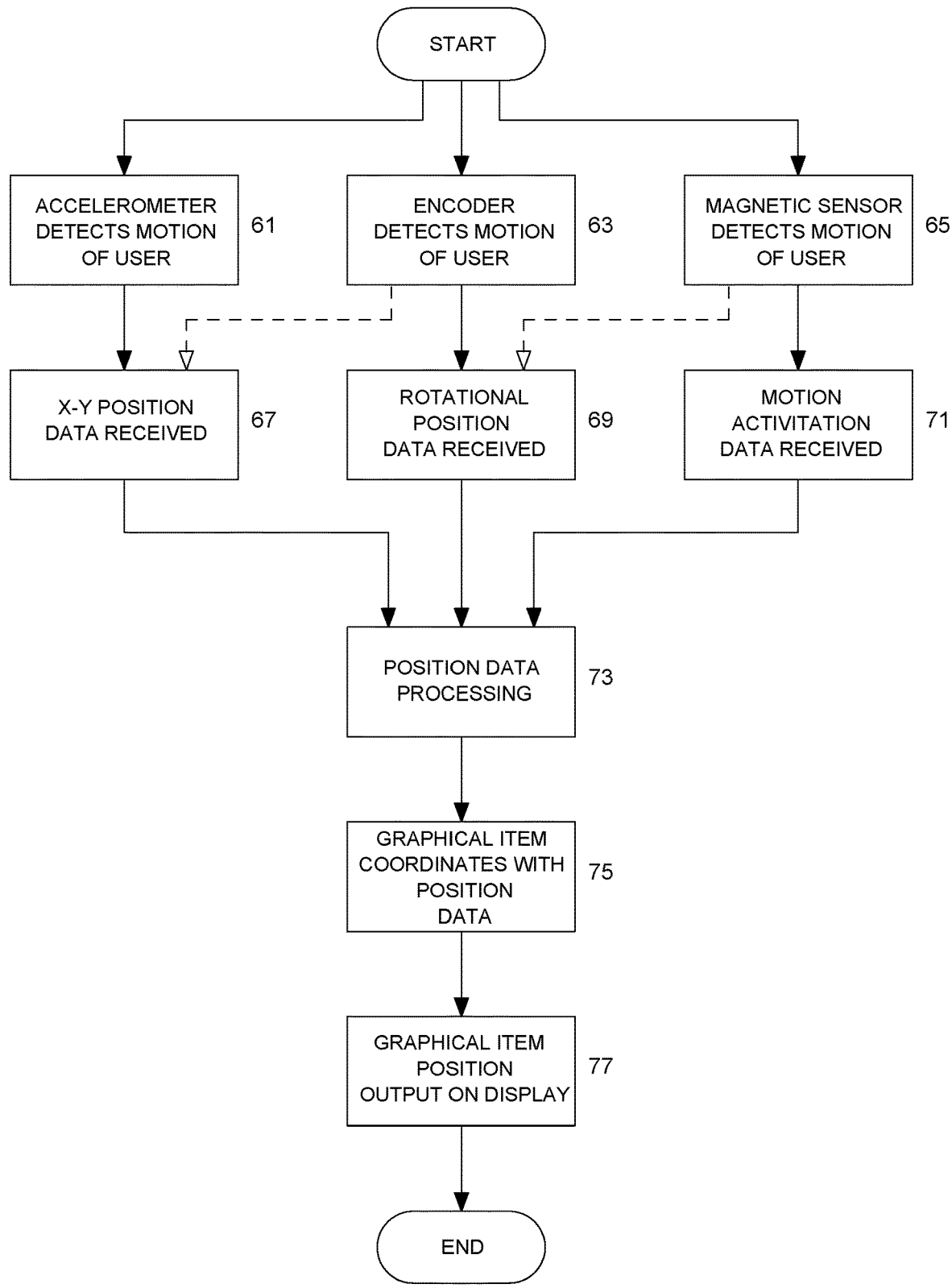
FIG. 3 is a flow diagram highlighting the functionality of the accelerometers, encoder and magnetic sensor.

A flow diagram in shown in FIG. 3 which further highlights the functionality of the accelerometers, encoder and magnetic sensors. The accelerometer sensing 61, the encoder sensing 63, and the magnetic sensing 65, each play a role in detecting either the position or the motion of the foldable computing device 11 as its segments 17 and 19 are rotated. More specifically, the accelerometer sensing 61 allows the x-y position data 67 to be received by the device, while the encoder sensing 63 allows the rotational position data 69 to be received by the device. For the magnetic sensing 65, this allows the motion activation data 71 to be received by the device. The encoder sensing 63 may also allow the x-y position data 67 to be received either in conjunction with the accelerometer sensing 61, or on its own. Similarly, the magnetic sensing 65 may allow the rotational position data 69 to be received in conjunction with the encoder sensing 63, or on its own. The position and motion data is then processed 73, and then the graphical item and its position in the displayed environment is then coordinated with the position data 75, and then from there it is output on the display 77. It is important to note that each of these hardware components can work autonomous from each other or together to enhance the coordination between the physical position of the device and what is shown on the display. Other sensors such as force sensing resistors and optical sensors may also be used to assist with this control interface function.

What is claimed is:

1. An apparatus comprising:
    (a) a flexible touch-sensitive display composed of a first flexible touch-sensitive display portion and a second flexible touch-sensitive display portion; wherein:
        (1) the first flexible touch-sensitive display portion is attached to a first structural support segment;
        (2) the second flexible touch-sensitive display portion is attached to a second structural support segment;
        (3) the flexible touch-sensitive display further comprises having a fully folded state;
        (4) the flexible touch-sensitive display further comprises having a partially expanded state;
        (5) the flexible touch-sensitive display further comprises having a fully expanded state;
    (b) a control interface whereby the first flexible touch-sensitive display portion and the first structural support segment can be rotated about a hinge situated between the first structural support segment and the second structural support segment such that the hinge is connected to an encoder sensor to move a graphical item shown on the flexible touch-sensitive display such that as the first structural support segment and the encoder sensor rotate to generate motion data, the motion of the graphical item shown on the flexible touch-sensitive display corresponds with the motion of the first structural support segment and the encoder sensor.

2. The apparatus of claim 1 wherein:
    the control interface is used to move a graphical item in a virtual environment.

3. The apparatus of claim 1 wherein:
    the control interface is used to move a graphical item in a gaming application.

4. The apparatus of claim 1 wherein:
    the control interface is used to move a graphical item in an augmented reality application.

5. The apparatus of claim 1 wherein:
    the control interface includes at least one accelerometer to detect the position of, in conjunction with the motion data generated from the encoder sensor, the flexible touch-sensitive display structural support segments relative to the physical ground plane.

6. The apparatus of claim 1 wherein:
    the control interface includes at least one accelerometer to detect the position of, in conjunction with the motion data generated from the encoder sensor, the flexible touch-sensitive display structural support segments relative to each other.

7. The apparatus of claim 1 wherein:
    the encoder sensor can be used to detect the angle of the flexible touch-sensitive display structural support segments relative to each other.

8. The apparatus of claim 1 wherein:
    the control interface includes at least one magnetic sensor to detect the position of, in conjunction with the motion data generated from the encoder sensor, the flexible touch-sensitive display structural support segments.

9. An apparatus comprising:
    (a) a flexible touch-sensitive display composed of a first flexible touch-sensitive display portion and a second flexible touch-sensitive display portion; wherein:
        (1) the first flexible touch-sensitive display portion is attached to a first structural support segment;
        (2) the second flexible touch-sensitive display portion is attached to a second structural support segment;
        (3) the flexible touch-sensitive display further comprises having a fully folded state;
        (4) the flexible touch-sensitive display further comprises having a partially expanded state;
        (5) the flexible touch-sensitive display further comprises having a fully expanded state;
    (b) a control interface whereby the first flexible touch-sensitive display portion and the first structural support segment can be rotated about a hinge situated between the first structural support segment and the second structural support segment whereby one structural support segment contains a magnet while the other structural support segment contains a magnetic sensor to move a graphical item shown on the flexible touch-sensitive display such that as the first structural support segment rotates about the hinge to generate motion data through the magnet and magnetic sensor, the motion of the graphical item shown on the flexible touch-sensitive display corresponds with the motion of the first structural support segment and the second structural support segment as they relate to the magnet and magnetic sensor.

10. The apparatus of claim 9 wherein:
    the control interface is used to move a graphical item in a virtual environment.

11. The apparatus of claim 9 wherein:
    the control interface is used to move a graphical item in a gaming application.

12. The apparatus of claim 9 wherein:
    the control interface is used to move a graphical item in an augmented reality application.

13. The apparatus of claim 9 wherein:
    the control interface includes at least one accelerometer to detect the position of, in conjunction with the motion data generated from the magnetic sensor, the flexible touch-sensitive display structural support segments relative to the physical ground plane.

14. The apparatus of claim 9 wherein:
    the control interface includes at least one accelerometer to detect the position of, in conjunction with the motion data generated from the magnetic sensor, the flexible touch-sensitive display structural support segments relative to each other.

15. An apparatus comprising:
(a) a flexible touch-sensitive display composed of a first flexible touch-sensitive display portion and a second flexible touch-sensitive display portion; wherein:
   (1) the first flexible touch-sensitive display portion is attached to a first structural support segment;
   (2) the second flexible touch-sensitive display portion is attached to a second structural support segment;
   (3) the flexible touch-sensitive display further comprise having a fully folded state;
   (4) the flexible touch-sensitive display further comprise having a partially expanded state;
   (5) the touch-sensitive displays further comprise having a fully expanded state;
(b) a control interface whereby the first flexible touch-sensitive display portion and the first structural support segment can be rotated about a hinge situated between the first structural support segment and the second structural support segment whereby the first structural support segment contains a first accelerometer and the second structural support segment contains a second accelerometer to move a graphical item shown on the flexible touch-sensitive display such that as the first structural support segment rotates about the hinge to generate motion data through the first accelerometer and the second accelerometer, the motion of the graphical item shown on the flexible touch-sensitive display corresponds with the motion of the first structural support segment and the second structural support segment as they relate to the first accelerometer and the second accelerometer.

16. The apparatus of claim 15 wherein:
the control interface is used to move a graphical item in a virtual environment.

17. The apparatus of claim 15 wherein:
the control interface is used to move a graphical item in a gaming application.

18. The apparatus of claim 15 wherein:
the control interface is used to move a graphical item in an augmented reality application.

* * * * *